United States Patent [19]

Schmid

[11] 4,346,603

[45] Aug. 31, 1982

[54] MICROFLOW TRANSDUCER

[75] Inventor: Carl E. Schmid, Easton, Conn.

[73] Assignee: The Perkin-Elmer Corporation, Norwalk, Conn.

[21] Appl. No.: 118,960

[22] Filed: Feb. 6, 1980

[51] Int. Cl.³ .............................................. G01F 1/70
[52] U.S. Cl. ................................................. 73/861.05
[58] Field of Search ..................................... 73/861.05

[56] References Cited

U.S. PATENT DOCUMENTS 3,605,741  9/1971  Spencer ........................ 73/861.05 X
3,662,598  5/1972  Spencer ............................ 73/861.05
4,240,291 12/1980  Andersson et al. ............... 73/861.05

OTHER PUBLICATIONS

A. T. J. Hayward—"Methods of Calibrating Flow Meters with Liquids—A Comparative Survey"—*Measurement & Control*,—vol. 10, Mar. 1977, pp. 108–112.

*Primary Examiner*—Charles A. Ruehl
*Attorney, Agent, or Firm*—S. A. Giarratana; F. L. Masselle; R. A. Hays

[57] ABSTRACT

A transducer for measuring extremely small rates of flow of a liquid under high pressure. A transparent tube has a small channel within which is contained a ball having a diameter substantially that of the channel. The tube is housed in a pressure vessel in such a manner that the high pressure liquid to be measured surrounds the tube over most of its length. The liquid flows externally of the tube toward the inlet end of the channel, thereby equalizing the pressure differential within and without the tube. As the fluid passes through the channel from the inlet to the outlet, it propels the ball past a sensor, such as a photoelectric device. The velocity of the ball past the sensor indicates the volumetric flow rate of the fluid. The device is periodically reset by momentarily reversing the direction of flow through the tube to return the ball to its starting position.

12 Claims, 9 Drawing Figures

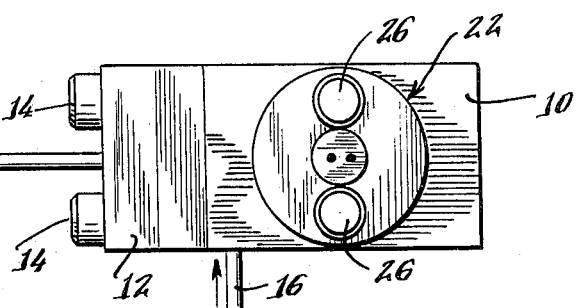
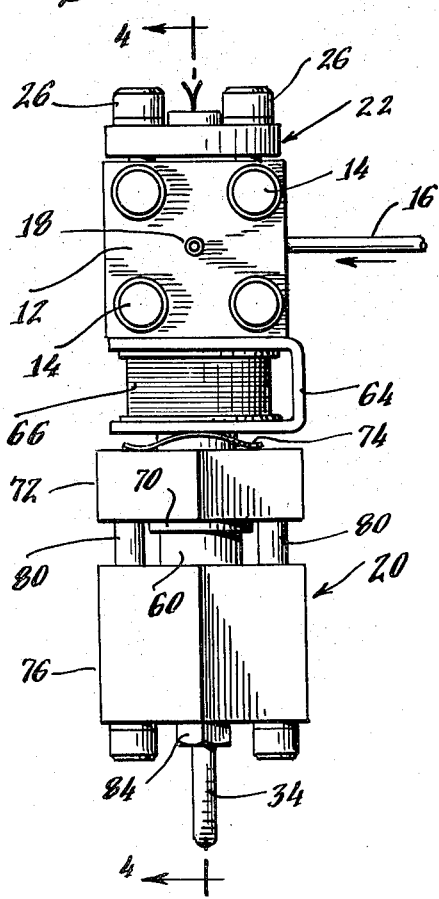
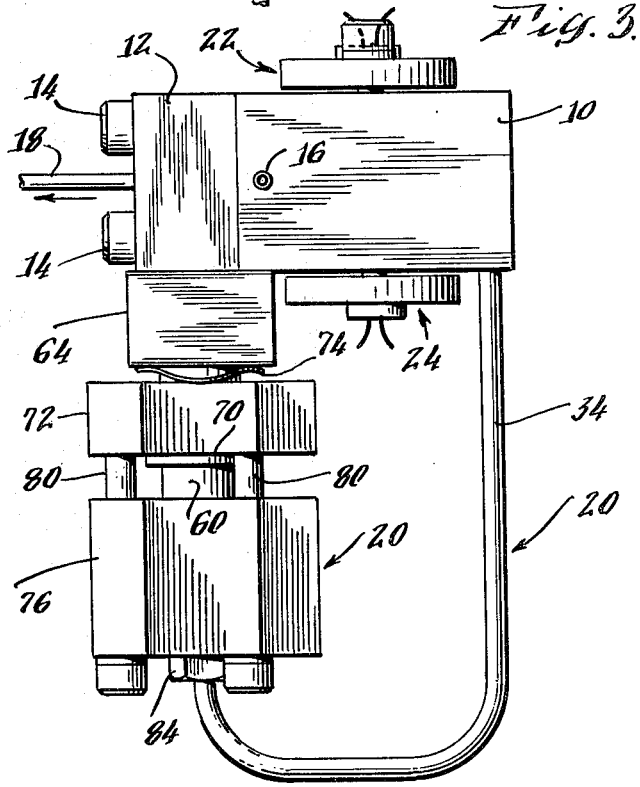
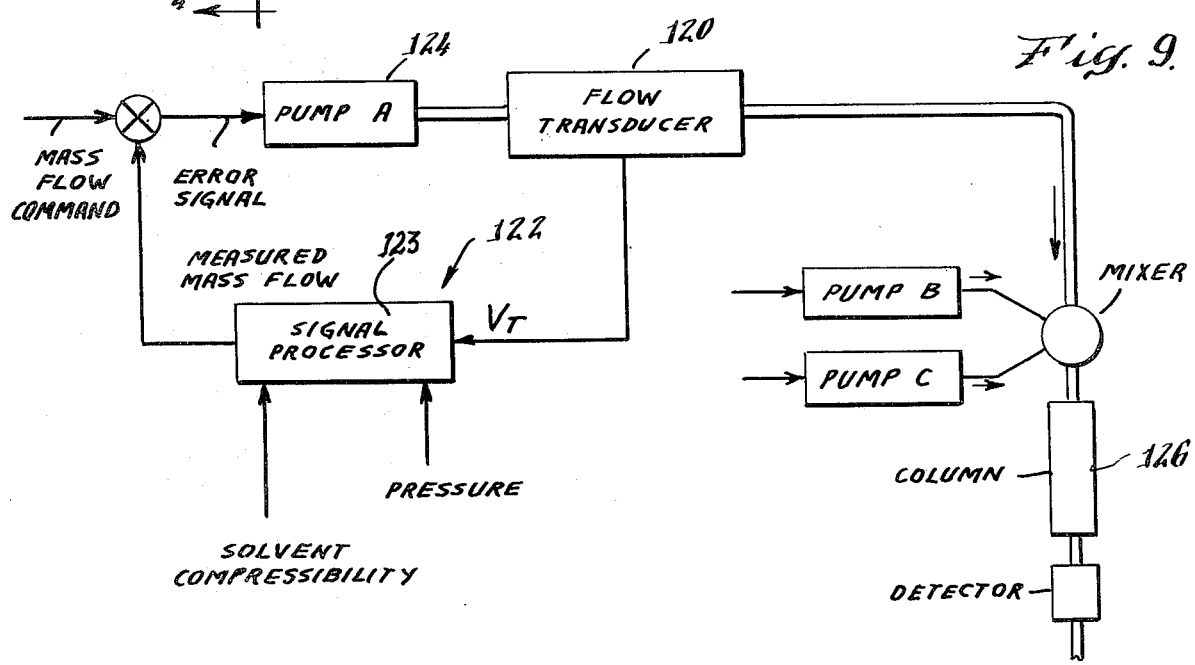

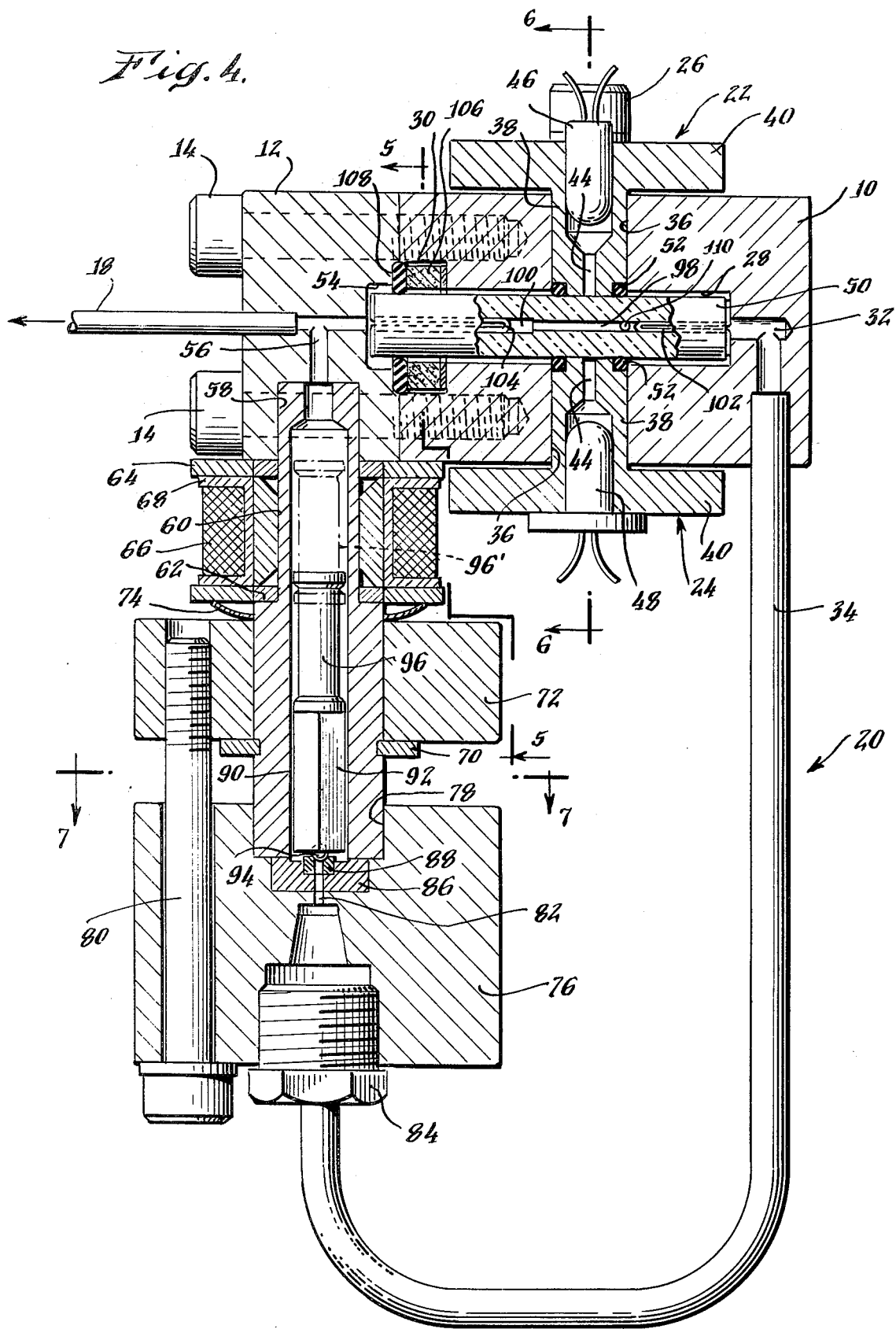

TO SIGNAL PROCESSOR 123
AS $V_T$

MICROFLOW TRANSDUCER

BACKGROUND OF THE INVENTION

In the field of liquid chromatography, it is necessary to precisely measure very small flow rates of liquids having different viscosities and under pressures commonly on the order of 5,000–6,000 psi. These liquids are the solvents which may be programmed sequentially through the liquid chromatographic column to elute various substances in a sample. The measured flow rates may be less than 10 microliters ($\mu l$) per minute and even as low as 1–2 $\mu l$ per minute.

There have been various attempts to measure flow rates of a liquid by measuring displacement of a float or other object through a tube. This is also a feature of the present invention. However, the prior art systems were incapable of handling either the extremely low flow rates or the extremely high pressures of the apparatus of this invention. For example, in U.S. Pat. No. 3,662,598 of Spencer, there is disclosed apparatus for measuring the flow rate of an intravenous feeding system. The apparatus contemplates measuring the oscillatory frequency of a ball, a technique which requires a considerable clearance between the ball and the tube, thereby reducing the accuracy of the measurement. A somewhat similar technique employed on a much larger scale is disclosed in an article by A. T. J. Hayward entitled "Method of Calibrating Flowmeters with Liquids—A Comparative Survey" published in *Measurement and Control*, Volume 10, March 1977. The device described therein is entitled a "Pipe Prover" and is a device for calibrating large flowmeters. The article points out that one of its main disadvantages is that it occupies a considerable amount of floor space. The prior art devices required dynamic seals operating between system pressure and ambient pressure. This is acceptable only when the seal leak rate is small compared to the measured flow rate.

The unique characteristics of a liquid chromatography system, including extremely low flow rates and high pressures create special problems which prior art fluid flow measurement systems are poorly equipped to handle. For example, pump displacement cannot be relied upon as a satisfactory means for measuring flow because leaks from check valves and seals operating between system and atmospheric pressure become a significant percentage of the total flow. Also, the leakage within a pump varies with column back pressure, as experienced with composition gradients between liquids of different viscosities.

Accordingly, it is a primary object of the present invention to provide an improved flow metering system. Other objects are to provide such a system which is capable of precisely measuring and controlling low mass flow rates on the order of 10 $\mu l$-3 ml per minute. Another object is to provide such a system which is capable of functioning under pressures up to approximately 6,000 psi. Another object is to provide such a system which is capable of functioning with fluids of substantially different viscosities. Another object is to provide a system which can be easily converted from one solvent to another without requiring flushing by large volumes of solvent. The manner in which the foregoing objects are achieved will be more apparent from the following description and appended claims.

SUMMARY OF THE INVENTION

An apparatus for precisely measuring low mass flow rates of a high pressure fluid comprising a conduit which defines an elongated passage therethrough having a fluid inlet and a fluid outlet. A piston within the passage is propellable therealong by fluid flow through the passage. The cross-section of the piston substantially fills the passage. A pressure vessel substantially encloses the conduit. The pressure vessel defines a fluid supply passage which is arranged to channel pressurized fluid about the exterior of the conduit and into the fluid inlet, and a fluid discharge passage which is arranged to discharge fluid from the fluid outlet. A sensor is positioned to detect the travel of the piston through the elongated passage in a direction from its fluid inlet to its fluid outlet. Means are provided which are responsive to the sensor for indicating the flow rate of the fluid in the elongated passage, and additional means are provided for reversing the fluid flow direction in the elongated passage to return the piston to its starting point.

BRIEF DESCRIPTION OF THE DRAWINGS

FIG. 1 is a top view of apparatus in accordance with the present invention;

FIG. 2 is a left end view of the apparatus of FIG. 1;

FIG. 3 is a front view of the apparatus of FIGS. 1 and 2;

FIG. 4 is an enlarged cross-section taken substantially along the line 4—4 of FIG. 2;

FIG. 9 is a schematic diagram of a fluid flow system incorporating the apparatus of the invention.

DESCRIPTION OF THE PREFERRED EMBODIMENT

Figure 5:
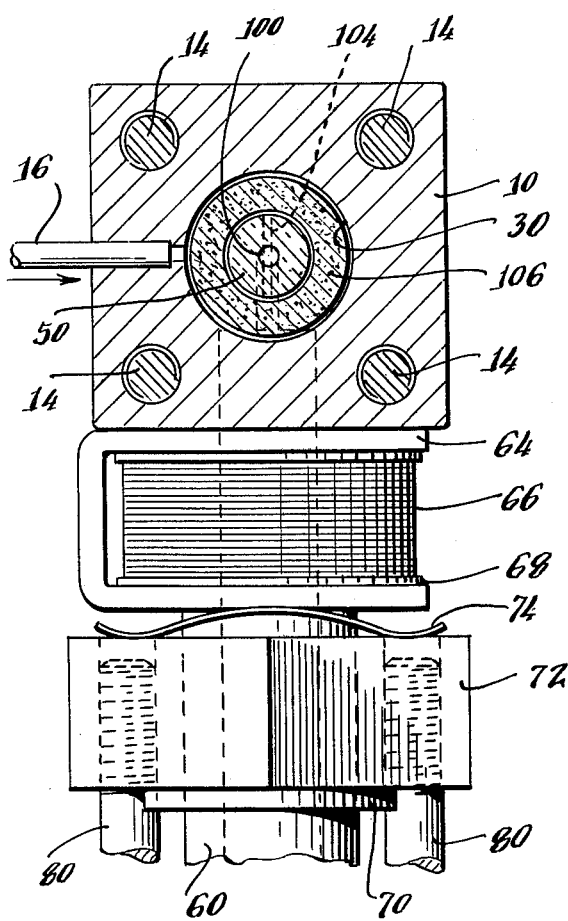
FIG. 5 is a cross-section taken substantially along the line 5—5 of FIG. 4.

FIGS. 1-3 illustrate the external appearance of an apparatus constructed in accordance with the present invention. It comprises a pressure vessel 10 of substantially rectangular cross-section, closed by a rectangular end cap 12 secured by screws 14. An inlet tube 16 is connected into the side of the pressure vessel 10 and an outlet tube 18 is connected to the end cap. Interconnecting the end cap 12 and the opposite end of the pressure vessel 10 is a reset loop 20 which will be described in detail below. A light emitting assembly 22 and a light detecting assembly 24 are mounted, respectively, to the top and bottom of the pressure vessel by means of screws 26. The pressure vessel 10 includes a central cylindrical bore 28, which extends from its left end as viewed in FIG. 4. At the left end, the bore 28 is enlarged to form an annular recess 30 which is in fluid communication with the inlet tube 16, as will be seen in FIG. 5. At its opposite end, the bore 28 communicates with a right-angled fluid passage 32 which connects with a tube 34 forming a portion of the reset loop 20.

Figure 6:
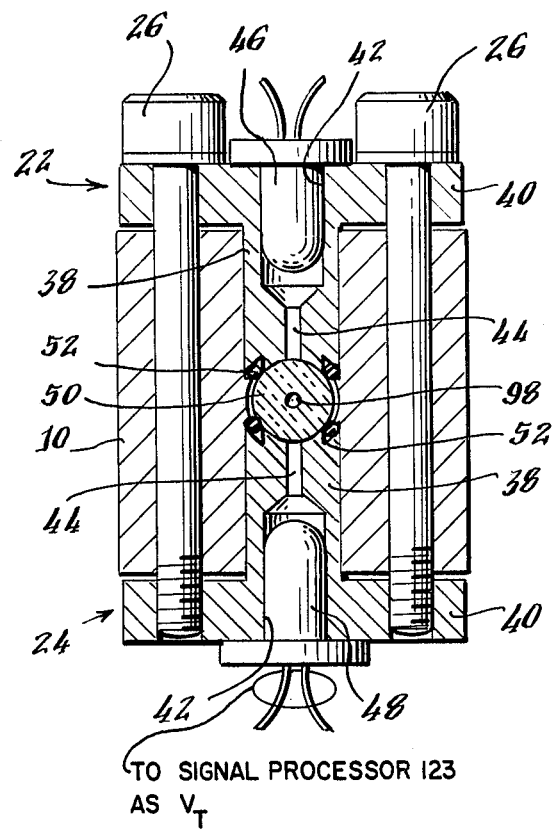
FIG. 6 is a cross-section taken substantially along the line 6—6 of FIG. 4.
Figure 7:
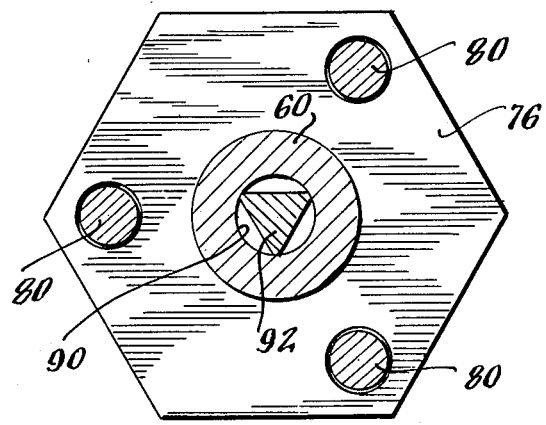
FIG. 7 is a cross-section taken substantially along the line 7—7 of FIG. 4.

Extending vertically through the pressure vessel 10 is a bore 36 at right angles to the bore 28. It contains light emitting assembly 22 and light detecting assembly 24. These assemblies are substantially identical, having cylindrical central stems 38 and circular end caps 40 interconnected by the screws 26, as will be seen from FIG. 6. Extending from each of the end caps 40 into the corresponding stem 38 is a recess 42 terminating in a light passage 44 extending through the end of each stem. Housed within recess 42 of the light emitting assembly 22 is a light source 46. Correspondingly positioned in the recess 42 of light detector assembly 24 is a light detector 48. The inner ends of the stems 38 abut against the external wall of a glass or quartz tube 50. Tube 50 is housed within the bore 28, but is of slightly smaller diameter. The ends of the stems 38 are sealed against the outer surface of the tube 50 by means of O-rings 52.

The end cap 12 defines a recess 54 which surrounds the left end of the tube 50 as seen in FIG. 4. A T-shaped passage 56 extends between the recess 54, the outlet tube 18, and a lower recess 58 which extends through the lower edge of the cap 12. Secured within the recess 58 and depending downwardly therefrom is a substantially cylindrical valve body 60, the lowermost portion of which is enlarged to form a shoulder 62. Secured between the shoulder 62 and the lower end of the end cap 12, by means of U-shaped iron pole piece 64, is a reset solenoid 66 wound on a conventional spool 68. Mounted below the pole piece and solenoid, by means of a snap ring 70, is a collar 72 which is separated from the pole piece 64 by means of a wave spring 74 under compression.

Closing the bottom of the valve body 60 is a valve seat block 76 which includes a recess 78 receiving the lower end of the valve body. Block 76 is secured to the collar 72 by means of screws 80. The valve seat block 76 includes a generally vertical fluid passage 82 therethrough to which is connected, by means of a conventional coupling 84, the end of tube 34 of the reset loop 20. The upper end of the fluid passage 82 is of relatively small dimensions defined by an annular insert 86 carrying an annular sapphire valve seat 88. The valve body 60 defines a vertical enlarged bore 90 communicating at its lower end with the fluid passage 82 and at its upper end with the T-passage 56 and end cap 12. Loosely contained within the bore 90 is a plastic valve stem 92 of triangular cross-section which carries on its lower end a sapphire ball 94 which mates with valve seat 88 to form a check valve. Also loosely mounted within the bore 90 and above the valve stem 92 is a magnetizable valve actuating armature 96.

Returning now to the glass tube 50 within the pressure vessel 10, it will be seen to include an elongated passage 98 therethrough. Passage 98 has a small diameter intermediate the light emitting and detecting assemblies 22, 24 and an enlarged portion 100 at its left end as viewed in FIG. 4. Extending into the right or inlet end of the passage 98 is a small stainless steel wire 102 which forms a limit stop. A similar wire 104 extends into the enlarged passage 100 from the left or outlet end of the passage. Mounted within the recess 30 and surrounding the left end of the glass tube 50 is an annular, sintered metal filter 106. The filter 106 is directly in the flow path of the inlet tube 16 as will be seen from FIG. 5. Positioned between the pressure vessel 10, the end cap 12, and the outlet end of the glass tube 50 is an O-ring seal 108. Finally, but importantly, there is contained within the passage 98 of the tube 50 a piston or ball 110 which substantially fills the passage 98 but is movable therethrough.

OPERATION

The fluid to be measured enters the apparatus through the inlet tube 16 and passes through the sintered metal filter 106. As viewed in FIG. 4, the liquid travels to the right around the outer periphery of the tube 50 within the bore 28, entering the inlet or right end of the passage 98. It then flows from right to left through the passage exiting from tube 50 at its left end. The exiting fluid fills the recess 54, thereby equalizing the pressures on the O-ring seal 108 and flows outwardly through the outlet tube 18. O-ring 108 prevents fluid from leaking from the outside diameter of tube 50, seals the cap 12 to pressure vessel 10, and seals the filter 106 to the pressure vesel. The filter distributes flow uniformly around tube 50 to ensure that all volumes are swept to facilitate rapid solvent changeover. By means of this construction, it will be noted that the pressures on the outside and inside of tube 50 are substantially equalized. The only exceptions are those areas of relatively small dimension which are encircled by the O-rings 52.

Figure 8:
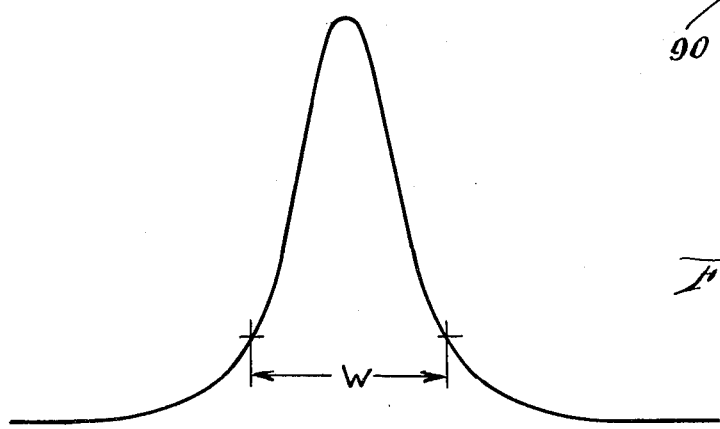
FIG. 8 is a curve illustrating the output signal of the apparatus of the invention.

As the measured liquid passes through the passage 98, it forces therethrough the piston or ball 110. As the ball substantially fills the cross-sectional area of the passage, the volume swept by the ball per unit time is substantially equal to the volumetric flow rate of the liquid. As the ball moves through the tube, it interrupts the light path between the light source 46 and the light detector 48. The light detector 48, which may be a phototransistor, thereupon generates an output signal of the form illustrated in FIG. 8. The width W of this signal at a selected level may be measured as an indication of the volumetric flow rate. After the ball 110 has passed through the light beam, it enters an enlarged portion 100 of the passage which permits any impurities or particles to be flushed by the ball. The travel of the ball toward the discharge end is limited by the stop wire 104. Travel of the piston toward the inlet end is similarly limited by wire 102.

The reset loop 20 takes no part in the operation described above. The loop is filled with a static liquid and the check valve formed between the sapphire ball 94 and the sapphire valve seat 88 remains closed as a result of the valve stem 92 weight.

After the ball 110 has passed the optical path between light source 46 and light detector 48, no useful data is being gathered and it is desired to rapidly reset the ball upstream in order to repeat the flow measurement. This is accomplished by momentarily energizing (100 ms approximately) the reset solenoid 66. This rapidly accelerates the armature 96 toward the dotted line position 96' illustrated in FIG. 4. As the armature begins its upward travel, fluid entering the gap forming between the bottom of the armature 96 and the top of the valve stem 92 creates a slight pressure reduction between the armature and valve stem, which momentarily lifts the valve stem and attached ball 94. At the same time, the rising armature causes liquid to rapidly circulate in the reset loop in a clockwise direction, as viewed in FIG. 4. The velocity of the liquid in the reset loop is much greater in magnitude and in opposite direction (for a short period of time) to normal flow in the tube 50. It thereby returns the ball 110 to its starting position against the stop wire 102, where it is held by the pressure generated by the still-rising armature. As the gap between the valve stem and the armature increases, the weight of the valve stem causes the checkvalve to close, and all liquid entering the flow sampler passes through the tube 50. The ball 100 in the tube 50 is therefore tracking flow, except for the short time the checkvalve is open.

The armature continues to travel upward and remains at position 96' until power is removed from reset solenoid 66. The armature 96 then falls as liquid leaks by the radial clearance between it and bore 90. The armature finally comes to rest on top of the valve stem and is in position to begin another reset cycle.

In FIG. 9, there is illustrated schematically a circuit employing a flow transducer 120, in accordance with the invention in a feedback loop 122 for controlling the solvent supply from a pump 124 to a liquid chromatography column 126. The feedback loop 122 includes a signal processor 123 to which are supplied inputs corresponding to solvent compressibility and pressure. These inputs are employed to process the volumetric flow rate signal from transducer 120 to produce, i.e., to indicates a mass flow rate output signal from the feedback loop 122.

It is believed that the many advantages of the invention will now be apparent to those skilled in the art. It will also be apparent that a number of variations and modifications may be made in the above invention without departing from its spirit and scope. For example, since it is the linear travel of the ball or piston 110 per unit time which is of interest, any means for sensing such travel could be employed. These could include, for example, magnetic or capacitive sensors. Two spaced sensors might also be used, the time of travel between them being measured. Accordingly, the foregoing description is to be construed as illustrative only, rather than limiting. This invention is limited only by the scope of the following claims.

What is claimed is:

1. Apparatus for precisely measuring low mass flow rates of a high pressure fluid which comprises:
    (A) a conduit defining an elongated passage therethrough having a fluid inlet and a fluid outlet;
    (B) a piston within said passage propellable therealong by fluid flow through said passage, the cross-section of said piston substantially filling said passage;
    (C) a pressure vessel substantially enclosing said conduit, said pressure vessel defining
        (1) a fluid supply passage arranged to channel pressurized fluid about the exterior of said conduit and into said fluid inlet, and
        (2) a fluid discharge passage arranged to discharge fluid from said fluid outlet;
    (D) sensor means positioned to detect the travel of said piston through a sensing region of said elongated passage in a direction from its fluid inlet to its fluid outlet;
    (E) means responsive to said sensor for indicating the flow rate of the fluid in said elongated passage; and
    (F) means for reversing the fluid flow direction in said elongated passage to return the piston substantially to its starting point.

2. The apparatus of claim 1 wherein said piston is a ball.

3. The apparatus of claim 1 wherein said elongated passage includes an enlarged portion downstream of said sensing region to flush particles around said piston.

4. The apparatus of claim 1 wherein said conduit is optically transparent.

5. The apparatus of claim 4 wherein said sensor means comprises a light source on one side of said conduit and a light detector on the other side of said conduit whereby the light path therebetween is at least partially interrupted by the travel of said piston along said passage.

6. The apparatus of claim 1 wherein said reversing means comprises:
    a reset loop establishing fluid flow communication between the inlet and outlet of said elongated passage;
    normally closed valve means in said loop for preventing flow therethrough during travel of said piston through said sensing region and in a direction from the fluid inlet to the fluid outlet of said elongated passage; and
    means for momentarily opening said valve means to establish flow of limited duration through said reset loop from the outlet to the inlet of said elongated passage to return said piston to a position in said passage normally upstream of said sensing region.

7. The apparatus of claim 6 wherein said valve opening means comprises:
    a magnetizable armature within said reset loop; and
    a solenoid coil positioned to retract said armature from said valve means when electrically energized.

8. The apparatus of claim 7 wherein said valve means comprises:
    a valve seat in said reset loop;
    a non-magnetic valve stem loosely contained within said loop between said valve seat and said armature; and
    a valve member carried by said valve stem for flow-stopping engagement with said valve seat.

9. The apparatus of claim 8 wherein said piston is a ball.

10. The apparatus of claim 9 wherein said elongated passage includes an enlarged portion downstream of said sensing region to flush particulates around said ball.

11. The apparatus of claim 10 wherein said conduit is optically transparent.

12. The apparatus of claim 11 wherein said sensor comprises a light source on one side of said conduit and a light detector on the other side of said conduit whereby the light path therebetween is at least partially interrupted by the travel of said ball along said passage.

* * * * *